April 7, 1964 J. F. CAGE, JR., ETAL 3,128,234
MODULAR CORE UNITS FOR A NEUTRONIC REACTOR
Filed Aug. 26, 1960 3 Sheets-Sheet 3

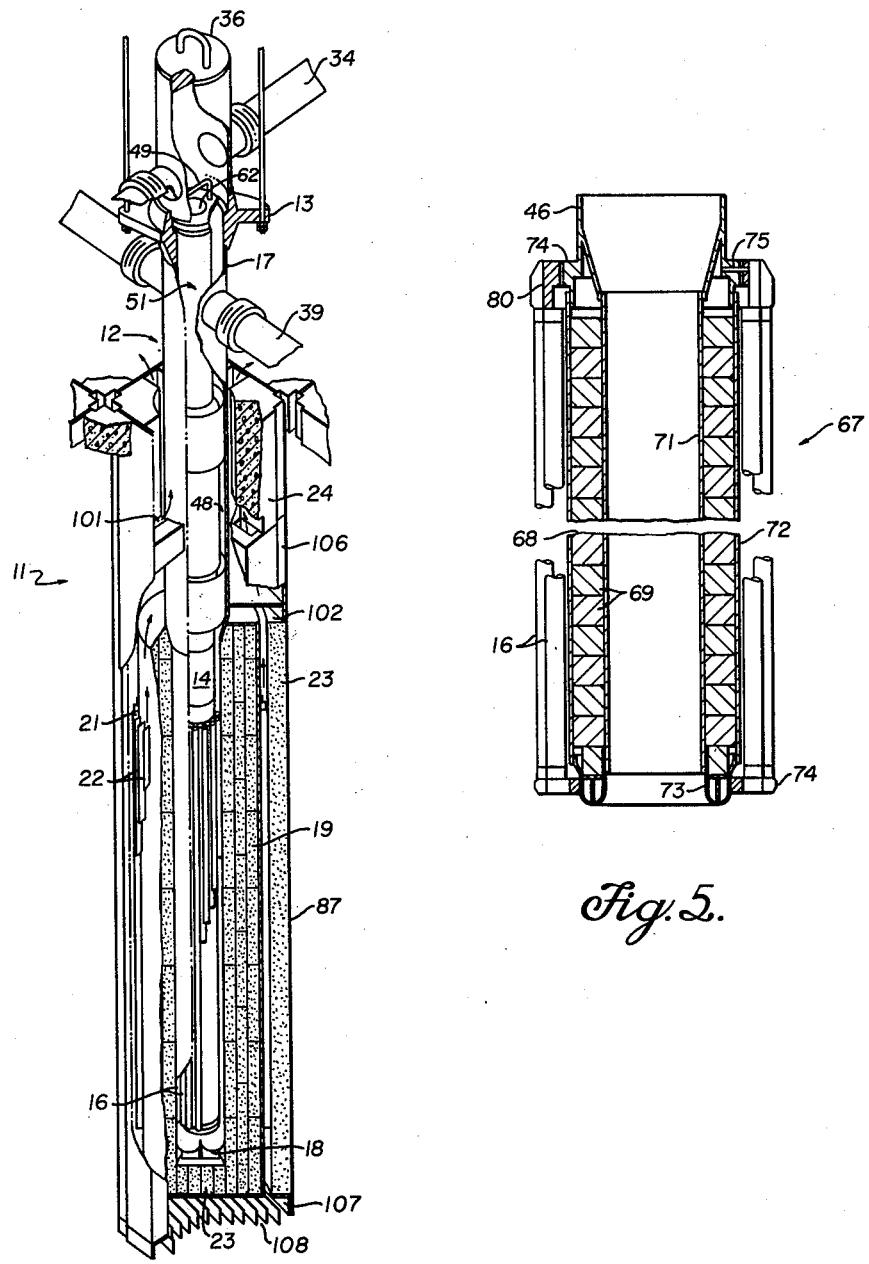

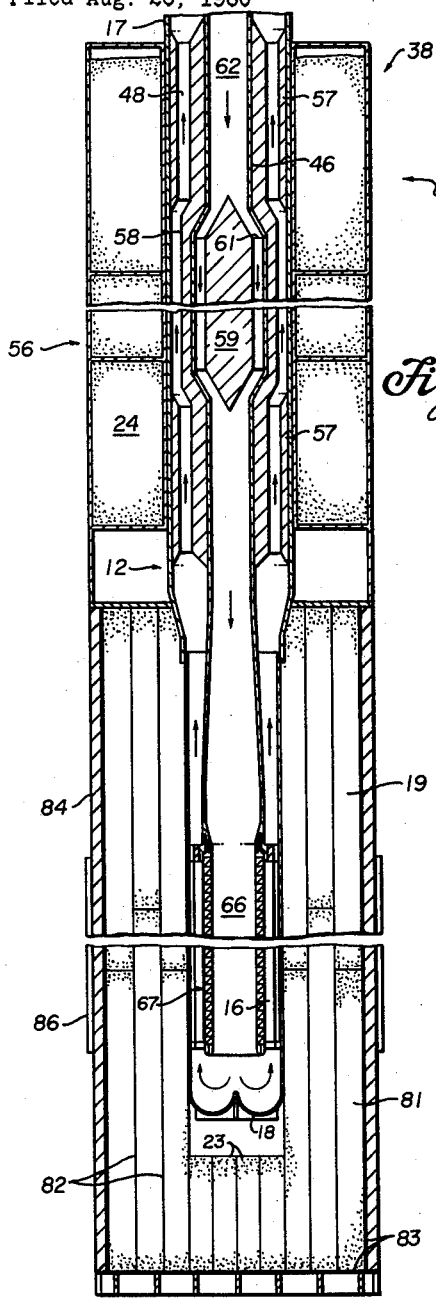
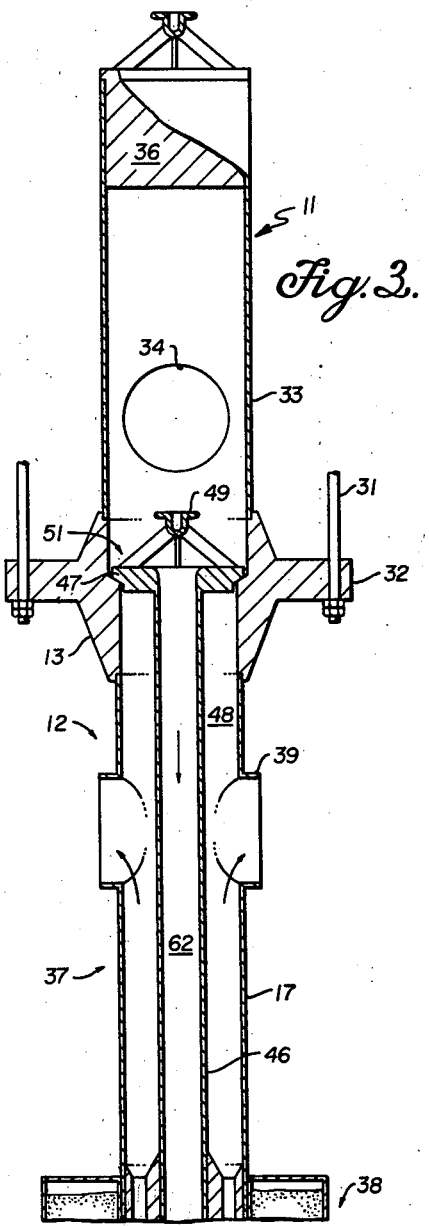
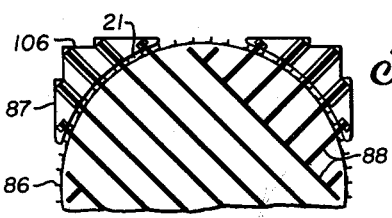

INVENTORS
JOSEPH F. CAGE, JR.
BY DUNHAM B. SHERER

ATTORNEY

United States Patent Office 3,128,234
Patented Apr. 7, 1964

3,128,234
MODULAR CORE UNITS FOR A NEUTRONIC REACTOR
Joseph F. Cage, Jr., Saratoga, and Dunham B. Sherer, Gilroy, Calif., assignors to the United States of America as represented by the United States Atomic Energy Commission
Filed Aug. 26, 1960, Ser. No. 52,318
13 Claims. (Cl. 176—43)

This invention relates in general to modular core units for use in neutronic reactors. More specifically, the invention relates to a modular core unit containing both fuel and moderator portions in which each portion is cooled by a separate coolant system, and to a neutronic reactor constructed from such modular units. The invention is particularly adaptable to sodium cooled-graphite moderated neutronic reactors.

The invention provides a modular core unit which may be inserted into or removed from a neutronic reactor independently of a plurality of similar units which together comprise the entire central reactor core. Each individual modular element or unit comprises a central coolant channel assembly which contains fissile fuel materials and through which a primary coolant passes. Unlike the prior art, massive portions of moderator are disposed in fixed relation about the channel assembly and preferably thermally bonded thereto. By proper positioning of insulation and exterior moderator cladding, heat produced in the moderator is induced to flow inward. A heat balance is achieved by using a secondary coolant, preferably a gas, to cool the radially outward portions of the moderator. Additional novelty is seen in the precise mechanical combinations of single modular units and in combinations of several modular core units in a single reactor.

The theory, construction, and operation of nuclear reactors in the art may be found in such references as "Principles of Nuclear Reactor Engineering," by Samuel Glasstone, published by D. Van Nostrand Company, Inc., Princeton, New Jersey, first edition, 1955; "The Proceedings of the Geneva Conference on the Peaceful Uses of Atomic Energy," held in Geneva, Switzerland, August 1955, available for sale at the United Nations Bookstore, New York city, New York; and U.S. Patents 2,708,656 and 2,714,577, Fermi et al.

For detailed information on sodium graphite reactors, reference is made to the "Proceedings of the International Conference on Peaceful Uses of Atomic Energy, Geneva, 1955," available for sale in the United Nations Bookstore, New York city, New York, particularly to the papers in volume 3 therein of W. E. Parkins, "The Sodium Graphite Experiment"; C. Starr, "Sodium Graphite Reactor 75,000 Electrical Kilowatt Power Plant"; and S. Siegal et al., "Basic Technology of Sodium Graphite Reactors." Reference is also made to two papers, "Advanced Design of a Sodium Cooled Thermal Reactor for Power Production," S. Levy et al., and "The Sodium Graphite Reactor Power Plant for CPPD," R. L. Olson et al., presented at the proceedings of the Second United Nations International Conference on the Peaceful Uses of Atomic Energy, Geneva, 1958, also available at the United Nations Bookstore. Reference is also made to the book "Sodium Graphite Reactors," by Chauncy Starr and Robert W. Dickinson, published by the Addison-Wesley Publishing Company, Reading, Mass.

As may be seen from examination of the prior art, the conventional sodium-graphite moderator reactors comprise massive blocks of graphite, usually clad, which are stacked to form a core for the reactor. The blocks are penetrated vertically by fuel elements, coolant channels, control rods, and other structure or accessories, depending upon the particular embodiment, and the entire structure is housed in an appropriate instrumented container adapted to the forced circulation of sodium through the fuel process channels.

While the above-described concept suffices to produce heat in sufficient quantities for production of electricity in commercial-size installations, the economics and efficiencies have precluded generally the production of power competitive with that produced from other energy sources; and the sodium-graphite moderated reactor art has shown many innovations and advances attempting to lower the unit cost factor. A very early development, still being explored, was the use of various cladding materials to prevent or limit the contact of the hot liquid sodium with moderator materials. Use of process tubes penetrating a containment vessel, the "calandria" principle, was developed to eliminate the necessity for cladding. Fuel materials, fuel elements, and reactor accessories have, of course, been under steady development in all types of commercial reactors.

Further, in recent design studies as indicated by the Levy paper in the second Geneva conference, supra, partial unitization of process channels, fuel elements, and portions of the moderator has also been suggeted. In this type of arrangement as much as 10 percent of the total reactor power is generated in the form of heat in the moderator, as a result of gamma ray absorption and the slowing down of neutrons. If the moderator is a solid, the removal of this heat is a problem, as it must be conducted to the surface of some coolant passage. If the volume of the moderator is large compared with the volume of the fuel and coolant, as is usual in graphite moderated thermal reactors, this usually requires that provision be made in the core for coolant passages specifically for the moderator and control element cooling. It has been the practice in the design of conventional graphite moderated reactors to allow the main coolant to flow through such passages.

If the coolant in the foregoing type of arrangement is a liquid metal, such as sodium, a number of disadvantages are evident. Specifically, the parasitic neutron capture of the additional liquid metal necessary for cooling the moderator and control rod elements adversely affects the nuclear performance of the reactor. Further, it is usually necessary to clad the moderator material with some substance impermeable to the coolant to prevent it from impregnating the moderator. This introduces additional parasitic material which further impairs the reactor's nuclear performance and adds complexity and cost. Another problem arises in that the use of the main coolant for control element cooling makes it necessary to use a seal to prevent leakage of the coolant at the point where the main coolant system is penetrated. This is particularly complicating if the main coolant is sodium, sodium-potassium, lithium, or any other chemically active material.

There has now been invented an improved modular core unit in which moderator, fuel, and coolant channel are combined into a single integrated structure which, together with other similar modular units provide a reactor core. In the preferred embodiment a cylindrical piece of moderator defining an axial bore is thermally bonded on its internal circumference to a primary coolant tube-fuel assembly. Cladding and, optionally, insulation on the outside moderator surfaces induce the moderator heat to flow inward toward the primary coolant. The cladding is structurally fastened to the coolant-fuel assembly, and additional moderator is supported in spaced relation to the cladding to shape the over-all cross sectional modular core unit to the configuration desired, e.g., hexagonal or square. A proper heat balance at the desired temperature is achieved through flow of a secondary coolant through the passages between the central and exterior moderator. Additional novelty is seen in alternative embodiments, in the precise structure of the preferred embodiment, and in the combination with other modular units to form a reactor.

The concept of the above described sodium cooled-graphite moderated reactor affords an opportunity for minimizing certain construction and maintenance costs. The individual units may be manufactured on an assembly-line basis and, to the extent that the entire reactor is comprised only of modular core units, single portions of the reactor may be removed and replaced without disassembly of the entire reactor.

Another obvious advantage of the invention is that economic removal of heat from moderator is permitted in individual, easily replaced modular units while at the same time avoiding the problems of the prior art designs discussed hereinbefore. Further advantage is apparent in the utilization of the modular concept for a reactor core to include in the modular unit all of the moderator or any desired fraction thereof, the top and bottom neutron reflectors, and a portion of the neutron shielding; the core can then be made up of a plurality of these units which are virtually identical, each of which can be removed or repaired as a separate entity. A further advantage resides in the use of a secondary sealed tube to form a structural member enclosing a large fraction of the unitized moderator, and serving as a secondary container for the main coolant in the event the primary coolant tube leaks. An additional important advantage resides in the arrangement of passages for a secondary coolant to remove heat from the moderator and control elements, the arrangement being such that the secondary coolant does not come in contact with portions of the moderator or main coolant piping which during operation are maintained at a high temperature. In addition to the mechanical advantages, the use of a separate moderator coolant makes it possible to adjust the moderator temperature somewhat independently of the reactor power level in order to improve reactor controllability.

Accordingly, an object of the invention is to provide an improved modular core unit and neutronic reactor made up of such units. Another object of the invention is to provide a modular core unit in which all components of the neutronic reactor core are contained, therein. A further general object is to provide a modular core unit which may be combined with other similar modular elements to form a complete neutronic reactor in which the individual modular units may be either partially or completely removed and/or replaced with a minimum of effort and without alteration or removal of adjacent units. Another object is to provide an improved modular core unit which may be manufactured at a cost which is not excessive in view of the advantages of replacement during maintenance operations. Another object is to provide a neutronic modular core unit which is more efficient than models provided in the prior art.

A further object of the invention is to provide a modular core unit in which part or all of the required moderator is contained about a central fuel-coolant channel. Another object of the invention is to provide a modular core unit in which additional coolant and fission product containment protection is provided by an envelope surrounding the moderator. Another object of the invention is to provide a modular core unit in which removal of moderator heat is accomplished by means of a secondary coolant system separated from the central fuel coolant system. More specifically, another object of the invention is to provide a gaseous moderator coolant system for a modular core unit in which the secondary coolant is separated from the primary coolant system. Another object of the invention is to provide radial slots, annular channels, or other passages in the moderator portion of a modular core unit which may be necessary for the passage of a secondary coolant therein.

Another object of the invention is to provide a modular core unit in which the moderator material disposed about the central coolant channel assembly is thermally bonded thereto. A further object is to provide structure, such as circumferential or peripheral insulation and cladding, which tends to promote flow of moderator heat inward toward the inner coolant assembly. A further object is to provide structural support for the moderator with the cladding. Another object is to maintain a proper heat balance within the moderator by use of a secondary coolant system in heat exchange relation with the exterior surface fo the cladding. Another object is to provide additional moderator exterior to the central cylindrical moderator so that void spaces will be minimized when a plurality of such units are in abutting relation.

The invention will be better understood upon consideration of the following description, example, and drawings, of which:

FIGURE 1 is a perspective side view, partly in cross section and partly cut away, of the preferred embodiment of the modular core unit of the invention;

FIGURE 2 is a cross sectional side view of the lowermost portion of a modular core unit in the preferred embodiment of the invention;

FIGURE 3 is a cross sectional side view of the upper portion of a modular core unit in the preferred embodiment of the invention;

FIGURE 4 is a cross sectional plan view of the bottom portion of a core unit embodiment showing the relationship of the edge-forming moderator elements with respect to the central moderator portion in the preferred embodiment;

FIGURE 5 is a cross sectional side view of the modular core unit fuel assembly adapted for use in the preferred embodiment.

Figure 6:
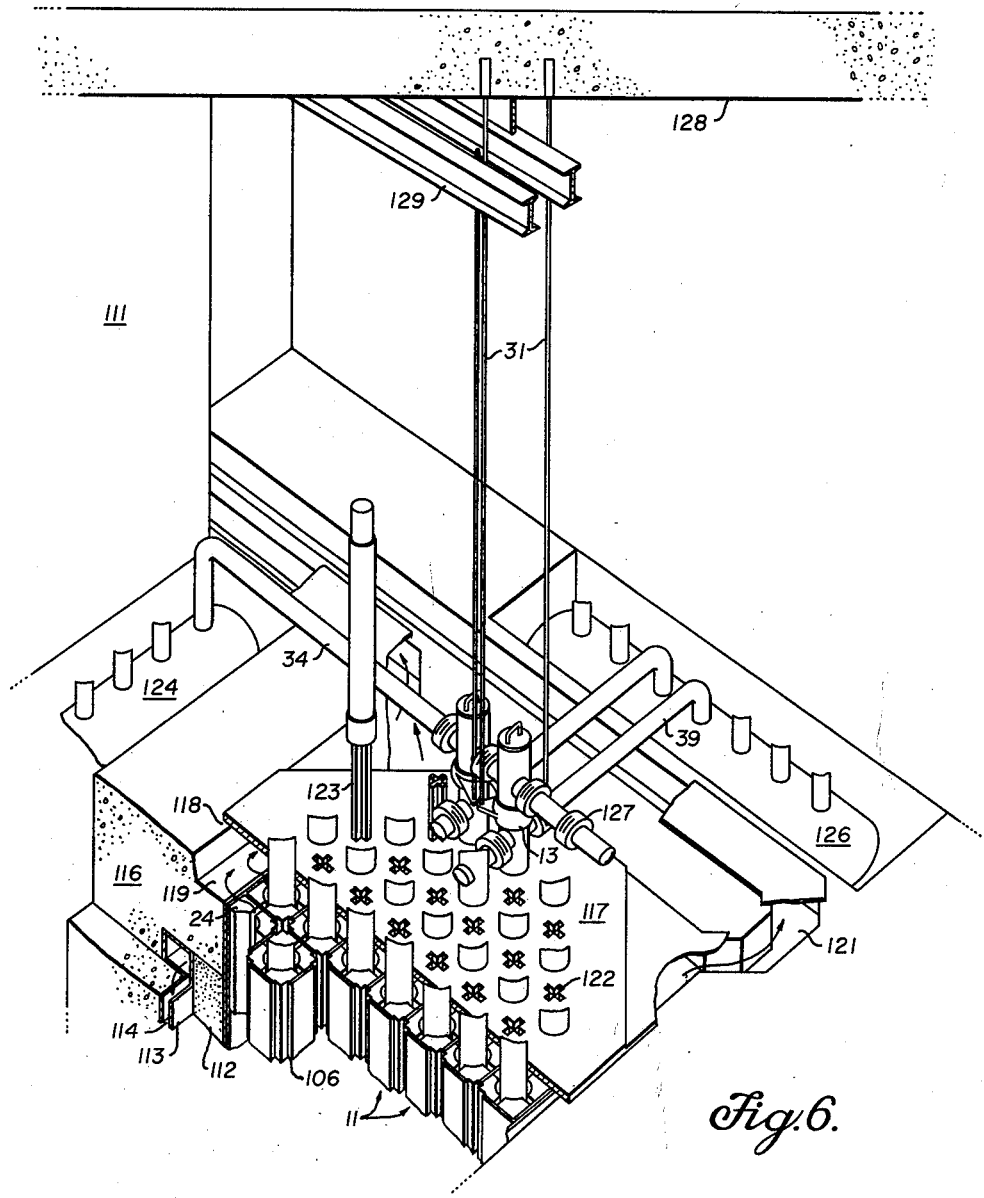
FIGURE 6 is a perspective view, partly cut away, showing a plurality of modular core units mounted together with other structure to form a reactor.

In the practice of the invention there is first provided a fuel assembly comprising a generally elongated fuel structure rigidly mounted within a self-contained nuclear process channel, i.e., a coolant channel in which flowing coolant would be in heat exchange relation. The structural materials should preferably have a low thermal neutron abosrption cross section and otherwise preferably aave superior moderating qualities. In addition, additional moderator material may be disposed in and about the fuel and coolant channel if desired as in prior modular elements. Obviously, the form and geometry of the fuel and process channel may be varied considerably for purposes of the invention and all of the various fuels and geometries commonly used in the sodium cooled-graphite moderated reactor art are admirably suited to use in the present invention.

In the conceptual embodiment of the modular core unit of the invention, the coolant channel-fuel element assembly, provided as indicated above, is preferably of the reversed flow type design shown perspectively in FIG. 1. Specfiically, there is shown modular unit 11 having a central coolant channel-fuel assembly 12 suspended from flanged support collar 13. The coolant flow channel comprises a central inflow tube 14 having cylindrical fuel elements 16 fastened about the outside thereof along the longitudinal axis and an outer containment tube 17 closed at bottom 18. The entire assembly 51 except the outer tube 17, may be withdrawn by vertical movement from the modular unit 11. Radially surrounding the coolant-fuel assembly 12 is a massive portion of exteriorly clad moderator 19, such as graphite, the thickness of which depends upon the neutronic requirements of the particular reactor embodiment. Radially outward a series of slots, tubes, or an annular channel 21 having finned supports 22 communicates longitudinally through the moderator for passage of secondary coolant. The modular unit 11 may also include optional reflector 23 and shielding 24 positioned above and below moderator 19, being integral therewith or held in place by appropriate supporting structure.

The conceptual embodiment of modular unit 11 shown is obviously not confined to the precise details disclosed by the drawing, but is subject to various equivalent means and variations within the scope of the module concept. For example, the primary coolant flow may be straight through the central channel from bottom to top and the fuel may be disposed therein in any manner conventionally used in fluid cooled reactors. The secondary coolant channels through the moderator may be in the shape of radial slots as well as annular structure, or both annular and slotted structure may be used. Additional reactor structure may be combined with the conceptual arrangement described hereinabove, as shown in FIGURE 1 and described at length hereinafter in the preferred embodiment of the invention, in which additional new and unexpected results are evident.

The details of the preferred embodiment of a modular unit designed for use in an actual reactor embodiment are more clearly shown in FIGS. 2 and 3. The unit 11 consists of a coolant channel fuel assembly 12 having an outer containment tube 17 with an exterior upper flanged mounting collar 13. Support rods 31 bolted through flange 32 also serve as supports for lifting and removing the unit 11 as described hereinafter. Tube 17 above collar 13 comprises an integral extension 33 penetrated by integral inlet pipe 34 and sealed by upper cap 36. An intermediate section 37 of central tube 17 extends downwardly to the modular portion 38 proper and is penetrated by integral outlet pipe 39. Extension 33 and tube 17 form a continuous tube from cap 36 to end closure 18, penetrated only by inlet pipe 24 and outlet pipe 39.

The upper portion 37 of coolant-fuel assembly 12 below collar 13 is essentially a double walled duct of which outer tube 17 forms the outer wall and double-walled inner tube 46 (corresponding to 14 in FIG. 1) forms the inner wall. Inner tube 46 is flanged at the top 47 against outer tube 17 to provide channel 48 between tubes 17 and 46. Lifting bail 49 is affixed to the topside of flange 47 to provide means for pulling the entire tubefuel assembly 51.

A central section 56 of coolant tube-fuel assembly 12, corresponding to the upper shielded portion of the reactor when inserted therein, is provided with outer and inner tube wall shields 57 and 58, respectively, and with a central shield plug member 59. These members are conveniently produced from welded tank-like components which have been filled with steel shot and granular $B_4C$. Plug 59 is suspended from the adjacent inner tube 46 by means of fin supports 61. Both inner and outer channels 62 and 48 turn outwardly slightly because of an enlargement of the annular inner shield 58 around plug 59 in order to prevent neutron streaming. The outer tube wall shield 57 is discontinuous along the longitudinal length of plug 59 to provide additional space for channel 48.

Fuel assembly 66 comprises inner tube 46, including inner wall shield 58, and fuel and reflector assembly 67. The fuel and reflector assembly 67 is shown separately in FIG. 5, wherein there may be seen an inner or central reflector tube 68 consisting of beryllium sectors 69 canned within inner and outer stainless steel cylinders 71 and 72, respectively, joined at the bottom by heavy steel ring 73 and at the top by tapered joinder with inner tube member 46. The reflector is included to provide more uniform power distribution, but may be replaced by a metal sleeve if desired. Pins or ribs 74 extend radially from the upper and lower outer surfaces of the reflector assembly 67 for attachment of fuel rods 16. The individual rods 16 comprise bonded uranium carbide in stainless steel. The rods 16 are welded to two ring-shaped spiders 80 sized for close engagement with the reflector tube 68. The rod and spider assembly is then detachably connected by three or more pins 75 at one end of the reflector tube 68 or, alternatively, mechanical interlocking devices (not shown) may be substituted.

In the preferred embodiment the moderator 19 consists of a cylindrical mass of graphite which fits snugly against outer coolant tube 17. The graphite 19 is not clad on the surface contiguous with the tube 17 and generally consists of disconnected blocks 81 or pieces fitting closely together and having radial breaks or spaces 82 which are taken up by expansion of the graphite 19 at higher temperatures. The graphite moderator 19 is preferably, although optionally, coated on the outermost circumferential and bottom surfaces with a layer of high temperature low neutron absorbing insulation 83, such as refractory ceramic fiber, available under the name of Thermoflex from Johns-Manville Sales Company. The insulated graphite 19 is clad with cladding 84, such as zircalloy, which also serves to structurally support the graphite and hold it against the tube 17. Optionally, radial fins 86 may be provided on the exterior cladding surface in order to increase the heat transfer surface area. Corner moderator pieces 87 are held in spaced relation at four evenly spaced positions around the cladding 84 by support members 88. The corner pieces 87 also preferably consist of graphite which need not be clad. The corner pieces 87 have a generally horizontal triangular cross section, the inside surface being convexly curved to match the outer surface of cylindrical graphite moderator 19. The spaces 21 between central moderator 19 and corner moderator pieces 87 provide longitudinal channels for the secondary coolant as discussed hereinafter. Both the central moderator 19 and the corner pieces 87 preferably extend above and below the horizontal plane of the fuel elements 16 to provide end reflector components 23 integral with the moderator 19.

The preferred design for the moderator 19 of the module unit 11 discussed immediately hereinbefore is obviously capable of being modified slightly; however, the various structural features are more or less dictated by necessity in overcoming the problems presented by the design itself. Specifically, the graphite moderator 19 is segmented for the reason that cracking could be expected with a solid moderator over the temperature variation contemplated. Further, if sodium cooling alone were relied upon, the secondary coolant being absent, the maximum graphite temperatures would, it is calculated, exceed 7000° F.; only slightly more reasonable temperatures and additional problems are obtained in a design in which the control rods are cooled either interiorly or exteriorly, since only a small amount of the heat generated in the graphite would thereby be removed. Forced flow of a secondary coolant through the various graphite pieces, unclad, would result in an uneven temperature distribution as the result of irregular spacing. Since there would be no cladding, the graphite would not serve to contain the sodium in the event of a leak; considerable heat loss would also result in the absence of cladding for the reason that the graphite and secondary coolant would conduct heat away from the primary coolant.

From the foregoing, it is apparent that the optimum operating conditions are obtained only with the preferred embodiment described hereinabove. By separating the primary and secondary coolant systems the direct flow of heat from the primary to the secondary system is avoided and the cladding 84 not only prevents secondary coolant from approaching the fuel-coolant assembly 12, but also contains the primary coolant in the instance of a break or leak. A snug fit is desired between the graphite moderator 19 and tube 17 so that heat produced within the moderator will be induced to flow more easily inwardly toward and into the primary coolant system, thereby resulting in additional heat savings and efficiencies. The insulation 83 is necessary for utmost efficiency in order to promote the flow of heat inwardly, so that only heat necessary to maintain the moderator at a reasonable temperature is removed by the secondary coolant. The insulation 83 further enables use of a much lower operating temperature for the secondary coolant, since the secondary coolant temperature and the moderator temperature become largely independent of one another. More complete transmission of the moderator heat inwardly is prevented as a practical matter by the fact that non-absorbing insulators are not available which will withstand temperature above 2000° F.

From the point of view of moderator cooling, it would be desirable to remove all graphite not inside the zircalloy container. The voids that would be left, however, would have to be filled and whatever material is used will have heat generated in it. Making the modules square and putting the external graphite inside the zircalloy would not improve the situation, since it is desired to operate the exterior portions of the radial configuration of the present embodiment at near the maximum temperature; this would not be possible if the corners were to operate at the maximum temperature.

In the preferred embodiment, a square mass of shielding material 24 having a cylindrical bore and longitudinal secondary coolant passages 101 therein is disposed in spaced relation above moderator 19 on unit 11. The space 102 between moderator and shielding 24 forms a header for the secondary coolant. Chamfer 106 extends the full longitudinal length of each moderator corner to provide room for passage of cruciform control rod blades, in the embodiment shown. Exterior bottom rim 107 is also provided to extend downwardly from the corner moderator pieces 87 to form a lower secondary coolant header 108.

A reactor embodiment in which a plurality of the module units 11 are used is shown in FIG. 6. The individual modules 11 are suspended in a pit or other container, as indicated generally by the walls numbered 111. In a typical arrangement, as an indication of magnitude, there are 37 modular core units arranged to form an octagonal core 18 feet, 3 inches across flats. The core units are suspended by mechanical attachment to the support collars 13 described hereinbefore. This permits the bottom of the core unit to expand or contract, as required with temperature variations, above a secondary coolant plenum (not shown). No reflector beneath the core units is necessary. However, a reflector 112 circumferentially surrounds the modules 11, and surrounding the reflector 112 is a thermal shield 113 having passages 114 therein for the passage of the secondary coolant into the lower plenum. Biological shield 116 is provided outside thermal shield 113 and on the bottom of the container (not shown). Top plate 117 is suspended on biological shield shoulder 118 in spaced relation above module shields 24, thereby defining an upper secondary coolant plenum 119 which exits through passage 121. The top plate 117 is penetrated by control rod openings 122 in which normally ride control rods 123 suspended from a drive mechanism. Inlet and outlet headers 124 and 126, respectively, connected to the modules 11 through inlet and outlet lines 34 and 39 lead to heat exchange equipment forming no part of this invention. Bellows type expansion joints 127 are provided on inlet and outlet lines between adjacent modules to eliminate pipe reactions from the modules, and to permit fixed points to be located in the piping as required to allow for piping expansion. The primary coolant headers are the only structural connection between modules. However, each module is supported individually by rods 31 attaching it to the ceiling 128. Other support means may be provided or substituted. A monorail 129 and crane (not shown) is provided in the containment area above the core area to facilitate refueling and/or replacement.

In the use and operation of the modular unit of the invention in a neutronic reactor, the modules are installed without the fuel assemblies therein. After the control rods and/or other conventional safeguards have been inserted or checked out, the modules may be loaded with fuel assemblies 66 by removing top caps 36 and lowering the inner tube fuel assemblies 51 into place by means of lifting bails 49. The top caps 36 are replaced and start up of the reactor is accomplished in a conventional manner after first initiating primary and secondary coolant flow. Preferably liquid sodium is used as the primary coolant, although other liquids may be appropriately substituted with concurrent adjustment of reactor parameters. Nitrogen is the preferred gaseous secondary coolant with graphite moderator for the reason that it does not react with graphite and is relatively stable with respect to other materials and conditions and moreover is inexpensive. However, other gases such as helium and even air may be used; with design modifications liquids such as liquid organic moderators would also be suitable. The primary coolant is cycled through heat exchangers in the conventional manner for recovery of the heat. The secondary coolant is introduced under forced flow conditions and is also preferably cycled, a purification and make-up stage being incorporated if necessary. However, the heat taken off by the nitrogen is merely vented off from the exchanger, e.g., with blowers, for the reason that the temperature and total heat content make heat recovery impractical.

With special reference to FIGS. 1 and 6, the sodium is cycled as follows: the fresh or cooled sodium is pumped from the exchanger station (not shown) to inlet header 124, from which it passes progressively to the inlet line 34, inner channel 62, end space 18, and then upwardly in contact with fuel elements 16 where heat is absorbed; the heated sodium then flows through outer channel 48 to outlet line 39, outlet header 126, and emerges therefrom into the heat exchangers.

The nitrogen coolant cycle begins at a reservoir or exchange station (not shown) from which it is pumped as needed into passage 114 in the thermal shield 113 to the inlet plenum (not shown) in the base of the core. Nitrogen then flows upwardly through the modular unit headers 108, through annular channels 21 in the module units 11, to upper modular header 102. The nitrogen then flows outwardly through modular shielding slots 101 to the plenum 119 below the reactor face plate 117 and out passage 121 to the heat exchanger station (not shown). Since the lower plenum of the core is not in any way sealed with respect to the individual module units, the nitrogen is also free to flow up between the modules 11 and cool the control rods 123 and exterior modular surfaces. No special effort need be made to seal off the reactor top plate since in the preferred embodiment a nitrogen atmosphere is provided for the entire core containment area. The containment nitrogen pressure is maintained above that of the module nitrogen pressure in order to maintain the core face at a lower temperature than the module nitrogen temperature.

In order to refuel the individual module units, the reactor is shut down for a period sufficient to remove latent heat and the sodium flow diminished greatly or stopped entirely. In the preferred embodiment the entire reactor containment or cell area is blanketed with an inert gas so that no precautions need be taken against oxidation; however, conventional fuel casks having an inert atmosphere may be adapted to refueling operations also. The top cap 36 is then removed and the entire inner tube-fuel assembly 51 for each individual module unit 11 is then removed by means of lifting bail 49, and transferred to storage. In a similar manner a new unit 51 is lowered into place and the cover 36 replaced. Individual fuel rods 16 may be removed from the assemblies 51 after a sufficient cooling period as conventional in the reactor art.

When it becomes necessary to replace an entire module, e.g., when a leak develops, the reactor is shut down and fuel from the entire reactor unloaded, in order to minimize radiation hazards. The sodium is allowed to freeze; the bellows on the inlet and outlet sodium lines of the module are then cut. In the event no provision has been made in the reactor top plate for withdrawing individual modules, it will also be necessary to cut an opening in the steel plate. The defective module is then replaced and the top plate and inlet-outlet lines are welded together, after which the reactor may again be operated.

The following is an operating embodiment of a specific modular fuel element and neutronic core thereof:

Modular Unit Parameters

| | |
|---|---|
| Fuel composition | 2.8% enriched UC. |
| Fuel cladding | 0.010 in. Type 347 SS. |
| Fuel rod dimensions | 0.8 in. dia. x 12 ft. |
| Fuel rods per module | 36. |
| Fuel channel moderator | 1.62 in. Be clad with 0.020 SS inside and 0.010 SS outside. |
| Coolant-fuel assembly dimensions | 11. in. dia. x 26 ft. |
| Module moderator composition | Graphite. |
| Moderator liner-insulator | Refractory ceramic fiber 0.2–0.6 in. thick. |
| Module width and length | 28.72 in. x 26 ft. |
| Moderator cladding composition | Zircalloy 2 (0.1 and 0.030 in.). |
| Module moderator length | 12 ft.-0 in. |
| Module shield block length | 6 ft.-0 in. |
| Secondary annular coolant channel width | 0.5 in. approx. |

Core Parameters

| | |
|---|---|
| Fuel | 44,000 lbs. |
| Fuel cladding, SS | 7,580 lbs. |
| Fuel moderator, Be | 14,100 lbs. |
| Module cladding, Zircalloy 2 | 25,500 lbs. |
| Module moderator, graphite | 4,760 lbs. |
| Reflector, circumferential | 2 ft. thick (approx.). |
| Effective core dimension | 18.3 ft. dia. x 12 ft. long. |
| Number modules per core | 37. |
| Array | Square spacing on 30 in. centers; rows of 3, 5, 7, 7, 7, 5, 3 modules. |
| Coolant, primary | Sodium. |
| Coolant, secondary | Nitrogen. |

Core Heat Transfer Data

| | |
|---|---|
| Maximum power/module removed by sodium | 18,000 TKw. |
| Average power/module removed by sodium | 14,650 TKw. |
| Inlet/outlet sodium temperature | 800° F./1050° F. |
| Maximum sodium flow/module | $81.6 \times 10^4$ lbs./hr. |
| Total heat removed by nitrogen | 16,560 TKw. |
| Inlet/outlet nitrogen temperature | 201° F./745° F. (max.). |
| Fuel element surface area per module | 91.3 ft.$^2$. |
| Maximum heat flux | 1,644,000 B.t.u./hr./ft.$^2$. |
| Average heat flux | 548,000 B.t.u./hr./ft.$^2$. |
| Sodium velocity | 26.2 ft./sec. |
| Maximum central temperature | 3,290° F. |
| Maximum clad temperature | 1,113° F. |
| Pressure drop through fuel | 20.2 p.s.i. |

Others

| | |
|---|---|
| Reactor control rods | 16 cruciform blades, 8 in. tip-to-toe, boron steel. |

While there has been described a preferred embodiment of the invention it will be understood that the invention is not limited thereby. All such alternate and equivalent features as desired are to be included herein except as limited by the following claims.

What is claimed is:

1. A modular core unit suitable for assembly with a plurality of like units to provide a nuclear reactor core comprising an elongated moderator material member constituting a fractional part of the entire moderator of said core, said moderator member having an exterior configuration adapted to be disposed in contiguous relation to other like moderator material members and having a re-entrant cavity formed interiorly therein, a primary coolant channel assembly disposed in said cavity, said channel assembly including nuclear fissile fuel disposed within said assembly and an exterior shell in close proximity to the interior moderator wall defining said re-entrant cavity, and a neutronic cladding material clad exteriorly about said moderator material member, said cladding being joined with said coolant channel assembly at the entrance region of said assembly into said moderator material member.

2. A modular core unit suitable for assembly with a plurality of like units to provide a nuclear reactor core comprising an elongated moderator material member constituting a fractional part of the entire moderator of said core, said member having a re-entrant cavity formed interiorly therein, a primary coolant channel assembly disposed in said cavity, said channel assembly including nuclear fissile fuel disposed within said assembly and an exterior shell in close proximity to the interior moderator wall defining said re-entrant cavity, a neutronic cladding material clad exteriorly about said moderator material said cladding being joined with said coolant channel assembly at the entrance region of said assembly into said moderator member, and additional moderator disposed in spaced relation to said clad moderator member, said additional moderator and said clad moderator together defining an exterior configuration adapted to be disposed in contiguous relation to other like modular core units.

3. A modular core unit suitable for assembly with a plurality of like units to provide a nuclear reactor core comprising an elongated cylindrical moderator material member constituting a fractional part of the entire moderator of said core, said moderator member having a re-entrant longitudinally co-axial bore therein, a primary coolant channel assembly disposed in said bore, said channel assembly including nuclear fissile fuel disposed within said assembly and an exterior shell in close proximity to the interior moderator wall defining said re-entrant bore, a neutronic cladding material clad exteriorly about said moderator material member, said cladding being joined with said coolant channel assembly at the entrance region of said assembly into said moderator member, and additional moderator disposed in spaced relation to said clad moderator member, said additional moderator and said clad moderator together defining an exterior configuration adapted to be disposed in contiguous relation to other like modular core units.

4. A modular core unit suitable for assembly with a plurality of like units to provide a nuclear reactor core comprising an elongated cylindrical moderator material member constituting a fractional part of the entire moderator of said core, said moderator member having a re-entrant longitudinal co-axial bore therein, a primary coolant channel assembly disposed in said bore, said channel assembly including nuclear fissile fuel disposed within said assembly and an exterior shell in close proximity to the interior moderator wall defining said re-entrant bore, a high temperature thermal insulating material having a low cross section for absorption of thermal neutrons, said insulating material disposed in the form of a thin layer about the exterior of said cylindrical moderator member, a neutronic cladding material clad exteriorly about said insulated moderator member, said cladding being joined with said coolant channel assembly at the entrance region of said assembly into said moderator member, and additional moderator disposed in spaced relation to said clad moderator member, said additional moderator and said clad moderator together defining an exterior configuration adapted to be disposed in contiguous relation to other like modular core units.

5. The modular core unit of claim 4 in which said additional moderator is a single member defining a cylindrical cavity slightly larger than said cylindrical moderator member.

6. The modular core unit of claim 4 in which said additional moderator consists of four sections, each section extending around a transverse cross sectional segment of said cylindrical moderator having an arc less than 90 degrees.

7. A modular core unit suitable for assembly with a plurality of like units to provide a nuclear reactor core comprising an elongated graphite cylinder having a coaxial bore extending into the interior of said cylinder from one end thereof, a concentric cylinder closed-end re-entrant coolant tube assembly disposed in said bore, said assembly having means for holding fissile fuel material therein and having coolant inlet and exit means exterior to said graphite cylinder and having an exterior shell in close proximity to the interior moderator wall defining said re-entrant bore, a high temperature thermal insulating material having a low cross section for absorption of thermal neutrons, said insulating material disposed in the form of a thin layer about the exterior of cylindrical moderator member, a neutronic cladding material disposed exteriorly about said insulating material and in close proximity thereto, said cladding being joined with said coolant channel assembly at the entrance region of said assembly into said moderator member, and additional moderator comprising four elongated moderator members of generally triangular cross section disposed in spaced relation to said graphite cylinder, said clad moderator and said additional moderator together defining an exterior configuration adapted to be disposed in contiguous relation to other like modular core units.

8. A modular core unit suitable for assembly with a plurality of like units to provide a nuclear reactor core comprising an elongated cylinder of abutting graphite blocks having a co-axial re-entrant bore extending partially through and into the interior of said cylinder from one end thereof, a concentric cylinder closed-end coolant tube assembly disposed in said bore, said coolant tube assembly including an inner tube and a closed-end outer tube, said outer tube in close proximity to the interior moderator wall defining said re-entrant bore, and further including mounting means for holding said inner tube concentrically within said outer tube and in spaced relation thereto and fuel mounting means for holding fuel materials therein and including coolant inlet and exit means exterior of said graphite cylinder and fissile fuel material mounted in said fuel mounting means, a high temperature thermal insulating material having a low cross section for absorption of thermal neutrons, said insulating material disposed in the form of a thin layer about the exterior of said cylindrical moderator member, a neutronic cladding material disposed exteriorly about said insulating material and in close proximity thereto, said cladding being joined with said coolant channel assembly at the entrance region of said assembly into said moderator material member, and additional moderator comprising four elongated moderator members of generally triangular cross section disposed in spaced relation to said graphite cylinder, said clad moderator and said additional moderator together defining an exterior configuration of generally square cross section.

9. The modular core unit of claim 8 in which said fuel mounting means and said fissile fuel are disposed centrally along the longitudinal axis of said moderator graphite.

10. The modular core unit of claim 8 in which said insulating material consists of a mat of ceramic fibers having low parasitic neutron capture characteristics.

11. The modular core unit of claim 8 including shielding material attached to said outer coolant tube above said graphite cylinder and in spaced relation thereto, said shielding material being slotted in the longitudinal direction of said graphite cylinder for passage of secondary coolant.

12. The modular core unit of claim 8 in which the longitudinal corners of said unit of square cross section, formed by said elongated moderator members and said cylinder, are chamfered to form openings for insertion of control rods and for flow of secondary coolant.

13. In a sodium cooled graphite moderated neutronic reactor having a plurality of self-contained modular fuel elements in which fuel material contained therein is cooled by forced liquid metal circulation through each module, the improvement comprising a reactor vessel including a lower secondary coolant gas plenum therein, a plurality of modular fuel elements of generally square cross section and chamfered corners in abutting relation, said elements being suspended from said reactor vessel, each of said modules including an elongated cylinder of abutting graphite blocks, said entire cylinder of graphite blocks being about 30 inches diameter and defining an inner coaxial bore of about 12 inches diameter extending downwardly from the top about three quarters the length of said cylinder of graphite blocks, an outer sodium coolant tube extending throughout each bore in close tolerance with the surface of each inner coaxial bore, said outer tube end within each bore being closed, an inner coolant tube co-axially mounted within said outer coolant tube, an end of said inner tube being in spaced relation to said closed outer tube end, a fuel assembly disposed in the annular region between said inner and outer coolant tubes and in spaced relation thereto, a layer of thermal insulating material having low thermal neutron absorption cross section disposed around the outside and bottom of each cylinder of graphite blocks, neutronic cladding material in close tolerance around the insulated outside and bottom of each cylinder of graphite blocks, said cladding being joined to each outer sodium coolant tube in the region of entry of said outer sodium coolant tube into said cylinders of graphite blocks, four elongated moderator members of generally triangular cross section disposed in spaced relation to each cylinder of graphite blocks, insulation and cladding to form four corners therefor with longitudinal edges and defining secondary coolant passages of uniform width longitudinally along said cladding, said longitudinal edges having chamfered corners, means for carrying and supporting said four elongated moderator members on said cylinders of graphite blocks, a block of transversely slotted shielding material defining an axial bore in spaced relation above each cylinder of graphite, said block having edges coplanar with the top surfaces of said cylinders of graphite blocks, said coolant pipe passing through each bore and being rigidly attached to each shielding block, said slots in each block providing passages for coolant gas, and an upper secondary coolant gas plenum above said plurality of modular units wherein said coolant gas is collected and withdrawn.

References Cited in the file of this patent

UNITED STATES PATENTS

| | | |
|---|---|---|
| 2,848,404 | Treshow | Aug. 19, 1958 |
| 2,861,034 | Wigner et al. | Nov. 18, 1958 |
| 2,982,713 | Sankovich et al. | May 2, 1961 |
| 3,000,728 | Long et al. | Sept. 19, 1961 |
| 3,039,944 | Zumwalt | June 19, 1962 |

FOREIGN PATENTS

| | | |
|---|---|---|
| 562,864 | Belgium | Oct. 14, 1957 |
| 817,265 | Great Britain | July 29, 1959 |

OTHER REFERENCES

NAA–SR–3573, AEC document, issued June 10, 1960.